(12) United States Patent
Tsuchiya et al.

(10) Patent No.: US 9,500,233 B2
(45) Date of Patent: Nov. 22, 2016

(54) PIVOT ASSEMBLY BEARING AND DISK DRIVE DEVICE

(71) Applicant: MINEBEA CO., LTD., Kitsaku-gun, Nagano (JP)

(72) Inventors: Kunihiro Tsuchiya, Tomioka (JP); Tadashi Uchida, Saku (JP)

(73) Assignee: MINEBEA CO., LTD., Kitasaku-gen (JP)

( * ) Notice: Subject to any disclaimer, the term of this patent is extended or adjusted under 35 U.S.C. 154(b) by 0 days.

(21) Appl. No.: 14/935,916

(22) Filed: Nov. 9, 2015

(65) Prior Publication Data

US 2016/0131190 A1 May 12, 2016

(30) Foreign Application Priority Data

Nov. 11, 2014 (JP) .................................. 2014-228573
Jul. 15, 2015 (JP) .................................. 2015-141288

(51) Int. Cl.
*G11B 5/48* (2006.01)
*F16C 33/80* (2006.01)
*F16C 19/54* (2006.01)
*F16C 33/78* (2006.01)

(52) U.S. Cl.
CPC ............... *F16C 33/80* (2013.01); *F16C 19/54* (2013.01); *F16C 33/7886* (2013.01); *G11B 5/4813* (2013.01); *F16C 2370/12* (2013.01)

(58) Field of Classification Search
CPC ............ G11B 19/20; G11B 5/448; G11B 5/55
USPC .................................. 360/265–265.9, 99.08
See application file for complete search history.

(56) References Cited

U.S. PATENT DOCUMENTS

| | | | |
|---|---|---|---|
| 2004/0120079 A1* | 6/2004 | Tsuchiya ................. | F16C 19/54 360/265.2 |
| 2006/0139813 A1* | 6/2006 | Hayakawa ........... | G11B 5/5526 360/265.2 |
| 2011/0188796 A1* | 8/2011 | Tsuchiya ................. | F16C 33/80 384/607 |
| 2015/0055250 A1* | 2/2015 | Tsuchiya .............. | G11B 5/5569 360/234.1 |

FOREIGN PATENT DOCUMENTS

| | | |
|---|---|---|
| JP | 2002-027701 A | 1/2002 |
| JP | 2006-077924 A | 3/2006 |
| JP | 2008-069920 A | 3/2008 |

* cited by examiner

*Primary Examiner* — Allen T Cao
(74) *Attorney, Agent, or Firm* — Oliff PLC (57) ABSTRACT

A pivot assembly bearing includes: a sleeve, a shaft inserted into the sleeve, a pair of rolling bearings disposed between the sleeve and the shaft such that the rolling bearings are separated apart from each other in an axial direction. The rolling bearings include an inner ring fixed to the shaft, an outer ring fixed to the sleeve, and a rolling element provided between the inner ring and the outer ring. In at least one of the rolling bearings, a first sealing member contacts an end face of the outer ring facing an outer side in the axial direction. Thus, a first labyrinth gap between the first sealing member and an end face of the inner ring facing the outer side in the axial direction, and a second labyrinth gap between the first sealing member and the shaft are formed.

18 Claims, 8 Drawing Sheets

PIVOT ASSEMBLY BEARING AND DISK DRIVE DEVICE

CROSS-REFERENCE TO RELATED APPLICATION(S)

The present application claims priority to and incorporates by reference the entire contents of Japanese Patent Application No. 2014-228573 filed in Japan on Nov. 11, 2014 and Japanese Patent Application No. 2015-141288 filed in Japan on Jul. 15, 2015.

BACKGROUND OF THE INVENTION

1. Field of the Invention

The present invention relates to a pivot assembly bearing used for a magnetic disk drive device, for example, and in particular to a sealing structure having a sealing gap.

2. Description of the Related Art

A typical pivot assembly bearing has a structure in which a sleeve is rotatably supported around the outer circumference of the shaft through rolling bearings. A pair of rolling bearings is provided so that the rolling bearings are separated apart from each other in the axial direction. In such a pivot assembly bearing, improvements have been strongly demanded in terms of preventing emission of particles caused by leakage or evaporation of oil contained in a lubricant filled in the pivot assembly bearing. Emitted particles adhered to disk or a magnetic head causes reading and writing errors. Reducing such emission of particles thus results in a favorable influence on the lifetime and the failure rate of the magnetic disk drive device. Reducing the emission of particles from the pivot assembly bearing is demanded at a higher level in particular for the pivot assembly bearings applied to a hard disk drive device used in a server.

As measures for reducing the emission of particles, technologies have been known and disclosed in Japanese Laid-open Patent Publication No. 2006-077924 and Japanese Laid-open Patent Publication No. 2008-069920, for example. In the technologies, an annular sealing member is disposed between the shaft and the sleeve on both end portions in the axial direction, a flange integrated with the shaft is provided, and a labyrinth gap is provided between the sealing member or the flange and the rolling bearing or the shaft. Another technology has been developed in which a magnetic fluid seal is provided between the sleeve and the shaft (Japanese Laid-open Patent Publication No. 2002-027701). These measures for reducing the emission of particles also function as measures for reducing contamination of pivot assembly bearing caused by foreign materials coming from outside of bearings.

Considering the above-described measures for reducing the emission of particles, the former technology still includes a minute gap even though it is a labyrinth gap. Accordingly, the emission of particles caused by an airflow passing through the gap cannot be completely prevented. Usage of the magnetic fluid seal in the latter technology eliminates the gap where air flows because the gap is filled with a magnetic fluid. However, the magnetic fluid seal raises the cost and may require a special process in assembly.

SUMMARY OF THE INVENTION

It is an object of the present invention to solve, at least partially, the problems in the conventional technology.

A pivot assembly bearing may include: a sleeve; a shaft inserted into the sleeve; a pair of rolling bearings disposed between the sleeve and the shaft such that the rolling bearings are separated apart from each other in an axial direction, the rolling bearings including: an inner ring fixed to the shaft; an outer ring fixed to the sleeve; and a rolling element provided between the inner ring and the outer ring; and, at least in one of the rolling bearings, a first sealing member contacting an end face of the outer ring facing an outer side of the pivot assembly bearing in the axial direction, forming a first labyrinth gap between the first sealing member and an end face of the inner ring facing the outer side in the axial direction, and forming a second labyrinth gap between the first sealing member and the shaft.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of the present invention will be described with reference to accompanying drawings.

Figure 1A:
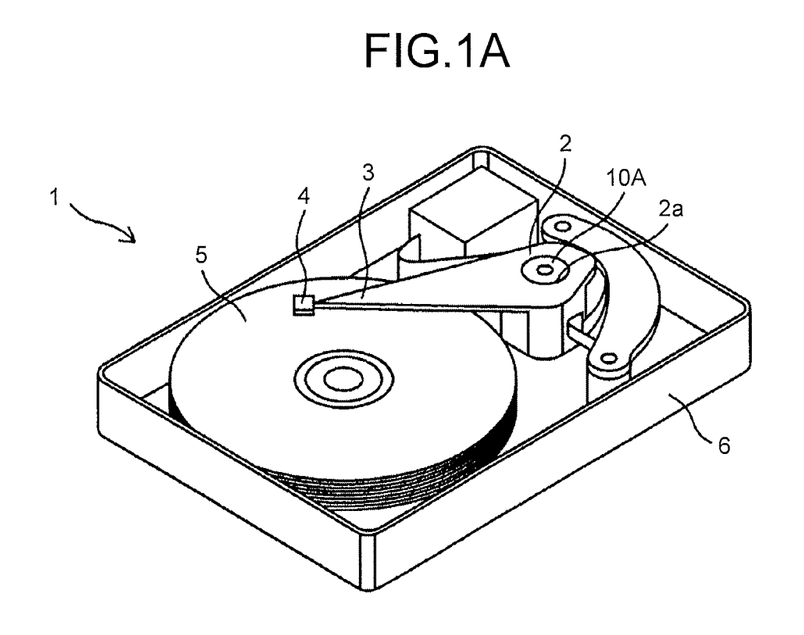
FIG. 1A is a perspective view illustrating a hard disk drive device to which a pivot assembly bearing according to an embodiment of the present invention is applied.

FIG. 1A illustrates a hard disk drive device 1 to which a pivot assembly bearing 10A according to an embodiment is applied. The hard disk drive device 1 is a storage device of a computer. In the hard disk drive device 1, a magnetic head 4 provided on the tip of a magnetic head arm 3 swingably supported by the pivot assembly bearing 10A illustrated in FIG. 1B moves above a magnetic disk 5. This operation allows the hard disk drive device 1 to record information on the magnetic disk 5 and read the recorded information from the magnetic disk 5.

Figure 1B:
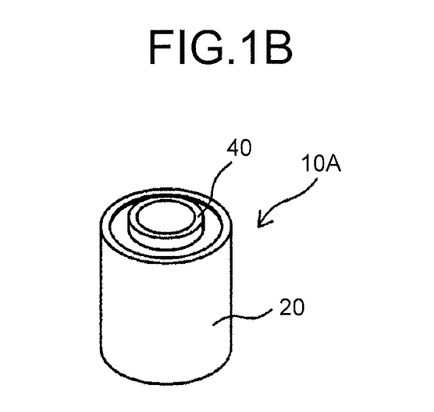
FIG. 1B is a perspective view of the pivot assembly bearing according to the embodiment.
Figure 2:
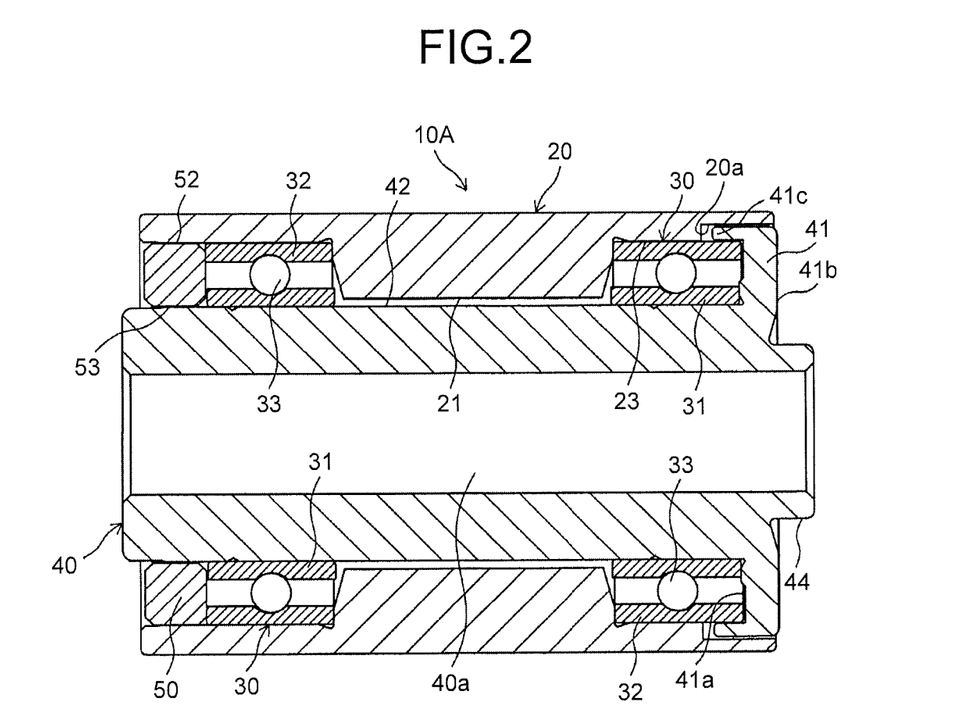
FIG. 2 is a sectional view of the pivot assembly bearing according to the embodiment.

As illustrated in FIGS. 1B and 2, the pivot assembly bearing 10A is a bearing device that enables a cylindrical sleeve 20 and a shaft 40 rotating relatively by inserting the shaft 40 into a rolling bearing 30 disposed inside the sleeve 20.

In the pivot assembly bearing 10A, the shaft 40 is fixed to the bottom part of a case 6 illustrated in FIG. 1A, and the sleeve 20 is fitted into a mounting hole 2a of a base portion 2 of the magnetic head arm 3. This structure enables the sleeve 20 to rotate and then the magnetic head arm 3 swings accompanied with the rotation of the sleeve 20.

The following describes the pivot assembly bearing 10A according to the embodiment with reference to FIGS. 2 to 5B.

As illustrated in FIG. 2, the pivot assembly bearing 10A has the following structure. A pair of rolling bearings 30 is disposed inside the cylindrical sleeve 20 and separated apart from each other in the axial direction (in the transverse direction in FIG. 2). The sleeve 20 is rotatably supported in relation to the shaft 40 through the pair of rolling bearings 30.

The rolling bearing 30 is a ball bearing including an inner ring 31, an outer ring 32, and a plurality of spherical rolling elements 33 held between the inner ring 31 and the outer ring 32. The rolling elements 33 are rotatably retained in a row in the circumferential direction by a not-illustrated retainer disposed between the inner ring 31 and the outer ring 32. The inner ring 31 is fixed to an outer circumferential surface 42 of the shaft 40, and the outer ring 32 is fasten to an inner circumferential surface 23 of the sleeve 20. The rolling bearings 30 are fixed to the shaft 40 and the sleeve 20 by adhesive, for example. In the rolling bearings 30, a lubricant such as grease is filled between the inner ring 31 and the outer ring 32.

The shaft 40 is a cylindrical member having a through-hole 40a in its center and a flange 41 at the right end portion in FIG. 2. The flange 41 includes a disk part 41b extending in the radial direction and a cylindrical part 41c projecting from the outer circumference of the disk part 41b in the axial direction. The shaft 40 has an annular projection 44 at its end on the side where the flange 41 is provided. The annular projection 44 surrounds an opening of the through-hole 40a. The outer circumferential surface of the cylindrical part 41c of the flange 41 faces an annular recess 20a formed at the end portion of the inner circumferential surface 23 of the sleeve 20. The inner circumferential surface of the cylindrical part 41c of the flange 41 faces the outer circumferential surface of the outer ring 32 of the rolling bearing 30 on the right side. The flange 41 has an annular groove 41a on its inner surface side, which faces the end face of the outer ring 32 in the rolling bearing 30 on the right side. In FIG. 2, when the inner ring 31 of the rolling bearing 30 on the left side is pushed in the right direction, the outer ring 32 of the rolling bearing 30 on the left side contacts a spacer 21. As a result, the outer ring 32 of the rolling bearing 30 on the right side is pushed via the spacer 21. Subsequently, the inner ring 31 of the rolling bearing 30 on the right side contacts the inner surface of the flange 41, whereby a preload is applied to both of the rolling bearings 30.

Figure 3:
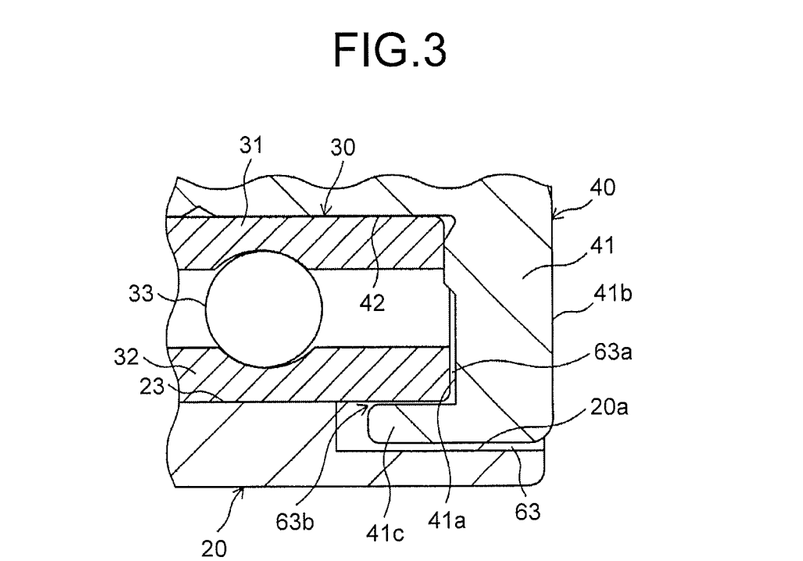
FIG. 3 is a partially enlarged sectional view illustrating a labyrinth gap provided in the right end portion in FIG. 2.

As illustrated in FIG. 3, a labyrinth gap 63 is provided between the outer circumferential surface of the flange 41 and the inner circumferential surface of the annular recess 20a of the sleeve 20. A labyrinth gap 63a is provided between an end face of the outer ring 32 of the rolling bearing 30 on the right side and the disk part 41b of the flange 41. A labyrinth gap 63b is provided between the outer circumferential surface of the outer ring 32 and the inner circumferential surface of the cylindrical part 41c of the flange 41. This structure provides a labyrinth gap having a longer distance in comparison with the conventional art.

Figure 4:
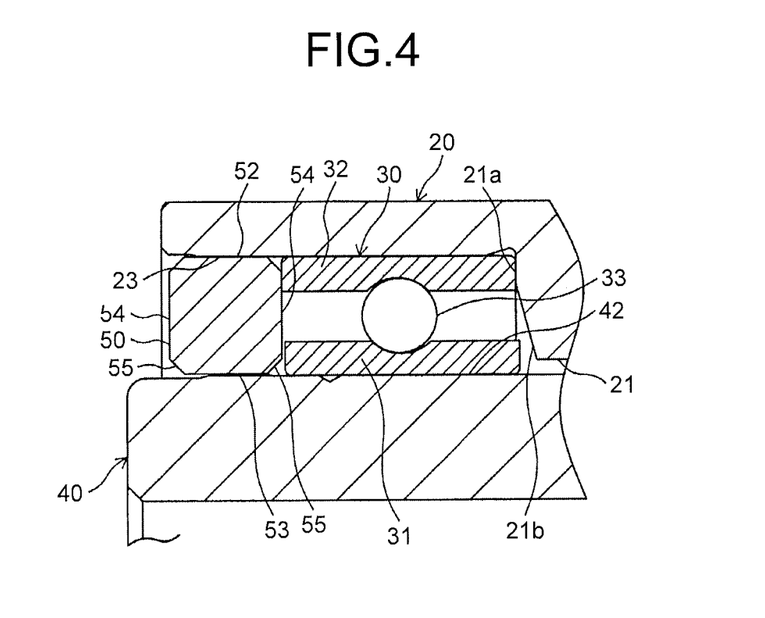
FIG. 4 is a partially enlarged sectional view of the left end portion in FIG. 2.

As illustrated in FIG. 2, the sleeve 20 has the spacer 21 in the central part of the inner circumferential surface 23 in the axial direction. The spacer 21 has a smaller inner diameter than that in the ends of the sleeve 20. As illustrated in FIG. 4, the spacer 21 has a positioning part 21a and an inclined clearance part 21b. The positioning part 21a is formed on a step surface on the spacer 21 and is orthogonal to the inner circumferential surface 23 of the sleeve 20. The inclined clearance part 21b is provided to an inner position in the axial direction extending from the positioning part 21a. The outer ring 32 contacts the positioning part 21a, whereby the two rolling bearings 30 are positioned in the axial direction. A preload is applied to the two rolling bearings 30 positioned in such a manner. Then, the inner ring 31 is fixed to the outer circumferential surface of the shaft 40 and the outer ring 32 is fixed to the inner circumferential surface 23 of the sleeve 20 by adhesive.

The pivot assembly bearing 10A has an annular seal plate (a first sealing member) 50 disposed at the end portion on the left side as illustrated in FIG. 2. The seal plate 50 is disposed for sealing the gap between the sleeve 20 and the shaft 40 and its outer circumferential surface 52 is fixed to the inner circumferential surface 23 of the sleeve 20 by adhesive for example.

Figure 5A:
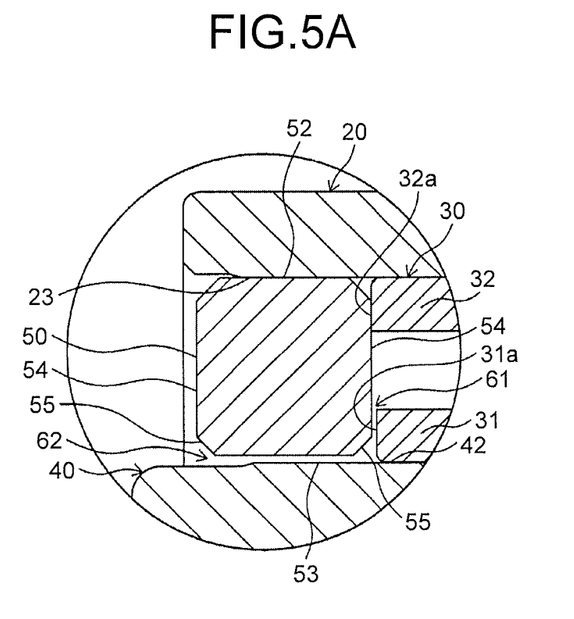
FIG. 5A is a sectional view illustrating the labyrinth gap provided in the portion illustrated in FIG. 4 according to the embodiment.

As illustrated in FIG. 5A, in the end portion on the left side of the pivot assembly bearing 10A in FIG. 2, an end face 31a of the inner ring 31 of the rolling bearing 30 on the left side is positioned on the axially inner side (to the right side in FIG. 5A) in relation to an end face 32a of the outer ring 32. The seal plate 50 contacts with the end face 32a of the outer ring 32. A first labyrinth gap 61 is formed between the seal plate 50 and the end face 31a of the inner ring 31. A second labyrinth gap (a sealing gap) 62 is formed between the annular inner circumferential surface (an annular surface) 53 of the seal plate 50 and the shaft 40.

To obtain the above-described structure, the inner ring 31 is fixed to the shaft 40 as described above while a preload is applied to the inner ring 31 toward the inner side in the axial direction. Accordingly, as illustrated in FIG. 5A, the end face 32a of the outer ring 32 is positioned axially outside (to the left side in FIG. 5A) in relation to the end face 31a of the inner ring 31 by an amount equivalent to an axial play in the rolling bearing 30. By contacting the seal plate 50 to the end face 32a of the outer ring 32 and fixing the outer ring 32 and the seal plate 50 to the inner circumferential surface 23 of the sleeve 20, the first labyrinth gap 61 is formed between the seal plate 50 and the end face 31a of the inner ring 31. The first labyrinth gap 61 is readily formed using a flat disk having no step as the seal plate 50 by contacting the seal plate 50 to the end face 32a of the outer ring 32 positioned on the axially outside direction relative to the end face 31a of the inner ring 31. The seal plate 50 can thus be manufactured at lower cost by press working, for example. An annular second labyrinth gap 62 is provided between the seal plate 50 and the shaft 40. The second labyrinth gap 62 can be formed by making the inner diameter of the seal plate 50 slightly larger than the outer diameter of the shaft 40. The second labyrinth gap 62 is adjusted to have a gap size capable of retaining a lubricating fluid by capillarity. Setting the labyrinth gaps in that manner provides the first labyrinth gap 61 and the second labyrinth gap 62 with narrower sizes compared to the conventional art. This structure can effectively prevent leakage and scattering of lubricating oil, or contamination by foreign materials coming from outside pivot assembly bearing even when the labyrinth sealing structure includes only the first labyrinth gap 61 and the second labyrinth gap 62.

Figure 5B:
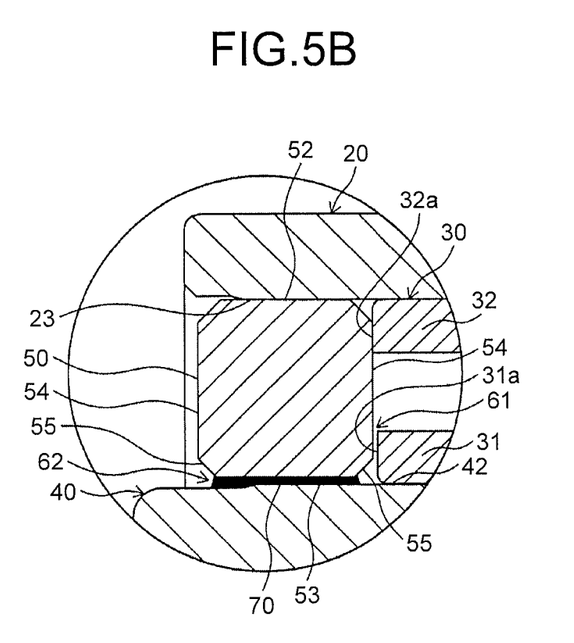
FIG. 5B is a sectional view illustrating an example of a labyrinth gap sealed by oil according to the embodiment.

As illustrated in FIG. 5B, retaining the lubricating fluid through the entire circumference of the annular second labyrinth gap 62 provides fluid seal 70 that can further improve the sealing function. In this case, the lubricating fluid is favorably retained in the second labyrinth gap 62 by the capillary force if the seal plate 50 has the cylindrical inner circumferential surface 53 facing the outer circumferential surface 42 of the shaft 40 and providing the second labyrinth gap 62, and each of the corner portions between the inner circumferential surface 53 and both end faces 54 includes a tapered surface 55 that gradually separates from the shaft 40 as the distance from the inner circumferential surface 53 increases in the axial direction, thereby gradually widening the second labyrinth gap 62 toward both ends.

The fluid seal 70 herein refers to a sealing structure in which the lubricating fluid is retained through the entire circumference of the annular second labyrinth gap 62 formed by the seal plate 50 for sealing the second labyrinth gap 62. As for the fluid seal 70, filling the second labyrinth gap 62 with liquid oil as the lubricating fluid provides an oil film having an appropriate thickness due to the capillarity. Therefore, the oil film can seal the second labyrinth gap 62. Any kind of oil can be used to provide the fluid seal 70 as far as the oil have the viscosity sufficient to retain the oil in the second labyrinth gap 62 by capillarity. The same kind of oil as the base oil of the grease enclosed between the inner ring 31 and the outer ring 32 is preferably used because it has no adverse effect on the grease. Examples of such a base oil include an ester oil, a mineral oil, and a synthetic oil.

In FIG. 5B, the sealing gap (the second labyrinth gap 62) is provided between the seal plate 50 and the outer circumferential surface 42 of the shaft 40. However, the present invention also includes a fluid seal structure in which a sealing gap is provided to the side of the inner circumferential surface 23 of the sleeve 20 instead of the side of the shaft 40. In this structure, the seal plate 50 is configured to contact the end face 31a of the inner ring 31 instead of the end face 32a of the outer ring 32.

In the pivot assembly bearing 10A, the emission of particles caused by leakage or evaporation of lubricating oil (base oil) contained in the grease filled inside the pivot assembly bearing 10A, and contamination by foreign materials from outside is reduced by the seal plate 50 at the end portion on the left side where the seal plate 50 is provided. In addition, the emission of particles and contamination by foreign materials are reduced by the flange 41 at the end portion on the right side where the flange 41 is provided. In addition, the minute labyrinth gaps 61, 62, 63, 63a, and 63b each hardly allow particles and foreign materials to pass therethrough, thereby effectively reducing the emission of particles and the contamination by foreign materials.

In particular, as the fluid seal 70 having the second labyrinth gap 62 filled with the oil is provided at the end portion on the left side where the seal plate 50 is disposed, the emission of particles and foreign materials passing through the second labyrinth gap 62 are completely prevented. The fluid seal 70 retains the lubricating fluid only by capillary force, which eliminates the necessity of an expensive magnetic fluid and a permanent magnet as in a magnetic fluid seal. The fluid seal 70 according to the embodiment can be therefore realized at lower cost and with a reduced number of parts in comparison with a magnetic fluid seal. Accordingly, the fluid seal 70 has advantages in terms of cost reduction and easiness in assembly.

The tapered surface 55 is provided on both ends in the axial direction (the width direction) of the inner circumferential surface 53 of the seal plate 50. The second labyrinth gap 62 has a tapered portion at both ends where the gap gradually widen. If the oil of the fluid seal 70 reaches one of the tapered portions at both ends of the second labyrinth gap 62, the oil is led to the central portion of the second labyrinth gap 62 in the axial direction due to the capillarity. As a result, the oil of the fluid seal 70 is prevented from flowing out, whereby the oil always remains in the central portion of the second labyrinth gap 62. That is, the fluid seal 70 shows more stable sealing function.

In the present embodiment, the end portion on the left side where the seal plate 50 is disposed is provided with the first labyrinth gap 61 formed by applying a preload to the end face 31a of the inner ring 31 of the rolling bearing 30. This means that the size of the first labyrinth gap 61 is equivalent to the axial play in the rolling bearing 30. Therefore, the first labyrinth gap 61 narrower than the conventional art can be obtained easily. This structure can prevent leakage and scattering of lubricating oil, and contamination by foreign materials from outside more effectively.

Figure 6:
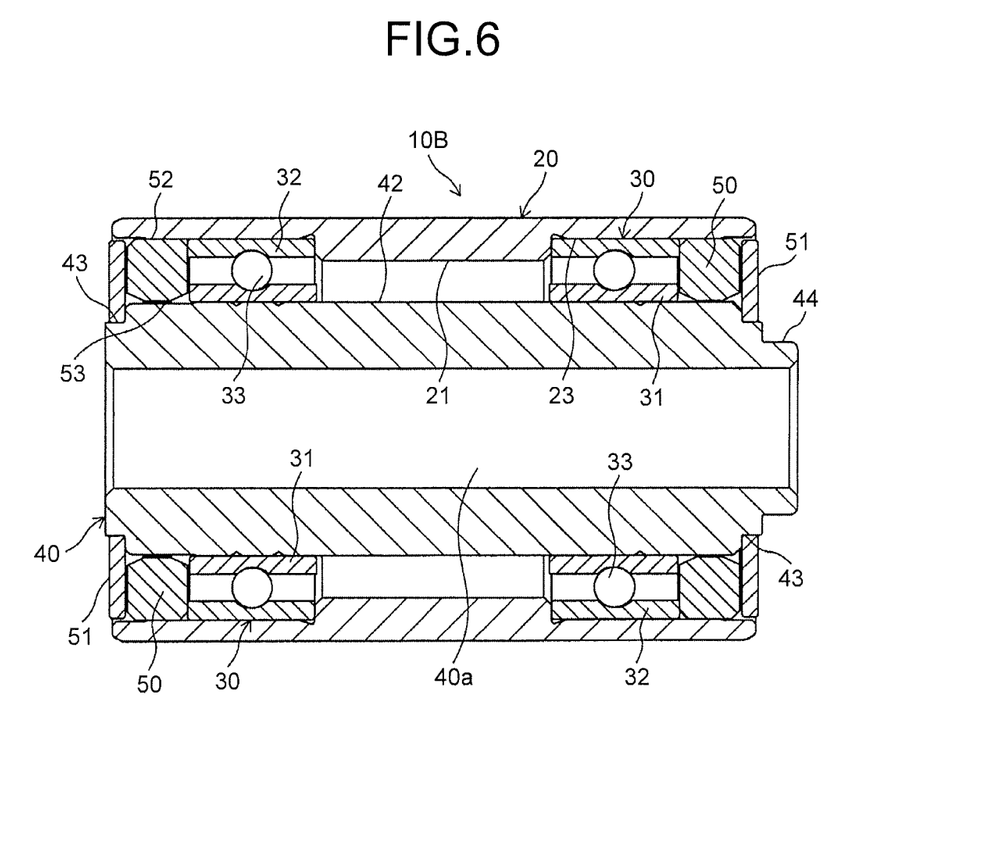
FIG. 6 is an entire sectional view of a pivot assembly bearing according to another embodiment of the present invention.
Figure 7A:
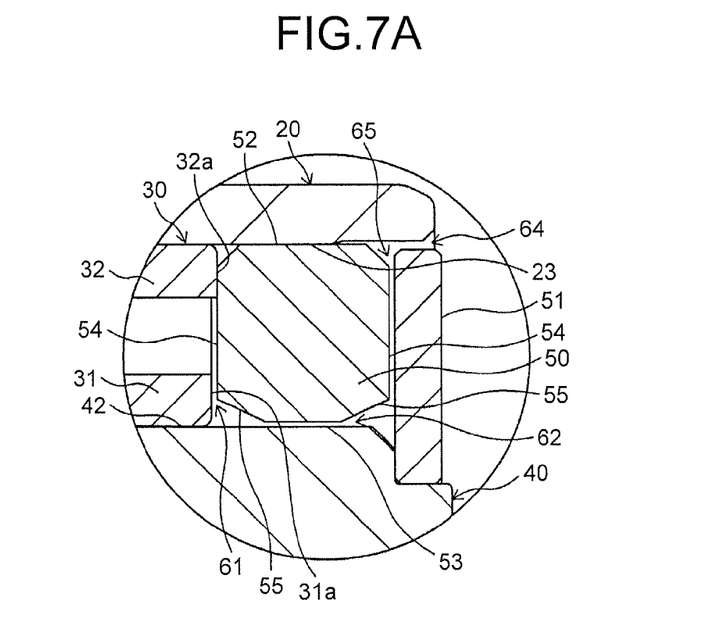
FIG. 7A is a sectional view illustrating a labyrinth gap according to the other embodiment.
Figure 7B:
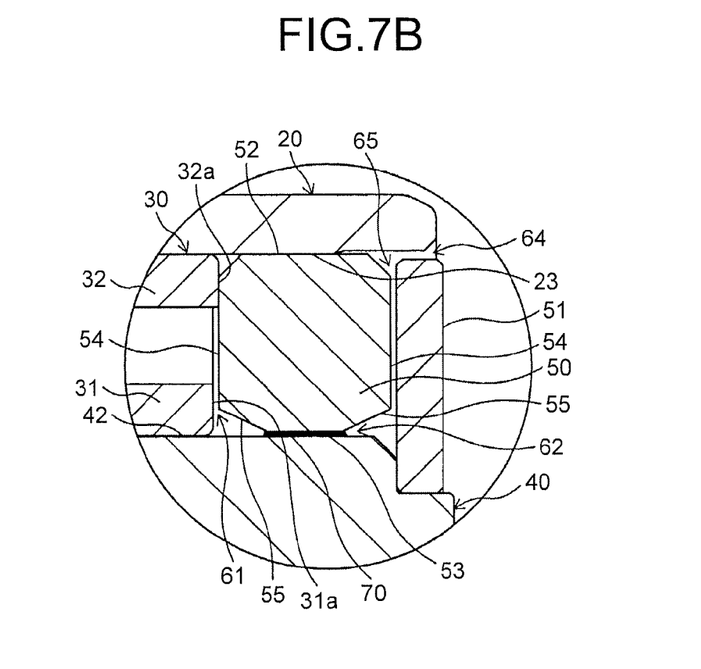
FIG. 7B is a sectional view illustrating an example of the labyrinth gap sealed by oil according to the other embodiment.

The following describes a pivot assembly bearing 10B according to another embodiment including a structure similar to the above-described embodiment with reference to FIGS. 6 to 7B. In the reference drawings and descriptions below, common numerals are assigned to similar components to the above-described embodiment, and overlapping explanation thereof will be omitted.

As illustrated in FIG. 6, the pivot assembly bearing 10B according to the other embodiment does not have the above-described flange 41 in the shaft 40. On both end portions of the shaft 40, the seal plate 50 fixed to the inner circumferential surface 23 of the sleeve 20 and the annular outer seal plate (the second sealing member) 51 positioned outside the seal plate 50 are disposed. Each of the outer seal plates 51 is press-fitted or bonded to a step 43 provided on both end portions of the shaft 40, thereby being fixed to the shaft 40. Each of the outer seal plates 51 faces the inner circumferential surface of the sleeve 20. As illustrated in FIG. 7A, a gap 64 is provided between the outer seal plate 51 and the inner circumferential surface of the sleeve 20, while a gap 65 is provided between the outer seal plate 51 and the seal plate 50. In such a manner, the pivot assembly bearing 10B according to the other embodiment has the same labyrinth structure on both end portions.

As illustrated in FIG. 7A, in both end portions of the pivot assembly bearing 10B, the seal plate 50 contacts the end face 32a of the outer ring 32. The first labyrinth gap 61 is provided between the seal plate 50 and the end face 31a of the inner ring 31. The annular second labyrinth gap 62 is provided between the seal plate 50 and the shaft 40. Also, in the pivot assembly bearing 10B according to the other embodiment, setting the labyrinth gaps in that manner provides the first labyrinth gap 61 and the second labyrinth gap 62 in narrower sizes in comparison with the conventional art. This effectively prevents leakage and scattering of lubricating oil, or contamination by foreign materials from outside even when only by the labyrinth sealing structure including the first labyrinth gap 61 and the second labyrinth gap 62.

Also, in the pivot assembly bearing 10B according to the other embodiment as illustrated in FIG. 7B, similarly to the above-described embodiment, the second labyrinth gap 62 may be filled with oil and thus the fluid seal 70 may be provided, thereby further improving the sealing capability.

In the pivot assembly bearing 10B, the fluid seal 70 is provided on both end portions. This structure can prevent the emission of particles and the contamination by foreign materials, sufficiently and stably. The tapered surface 55 of the seal plate 50 constitutes a capillary seal, thereby preventing the oil of the fluid seal 70 from flowing out.

The outer seal plate 51 is disposed outside the seal plate 50, thereby achieving effect of preventing the emission of particles and the contamination by the foreign materials more effectively. The outer seal plate 51 can also prevent the oil of the fluid seal 70 from flowing out due to airflow.

Also in the other embodiment, the first labyrinth gap 61 is obtained by applying a preload to the end face 31a of the inner ring 31 of the rolling bearing 30, in the same manner as the above-described embodiment. As a result, the first labyrinth gaps 61 are readily formed and made as narrow as possible. The pivot assembly bearing 10B can therefore prevent leakage and scattering of lubricating oil, and contamination by foreign materials from outside more effectively.

The hard disk drive device 1 illustrated in FIG. 1, in which the magnetic head arm 3 is swingably supported by the pivot assembly bearing 10A according to the above-described embodiment, can maintain internal cleanliness, and thus increases the reliability of the device. Similar advantages can be achieved when the pivot assembly bearing 10B is adopted instead of the pivot assembly bearing 10A.

Different variations in the shape of the annular surface facing the sealing gap in the first sealing member are possible as described below.

In the above-described embodiments, the seal plate 50 constitutes the first sealing member. The first sealing member includes the annular surface (the inner circumferential surface 53) facing the annular sealing gap (the above-described second labyrinth gap 62) provided in such a shape that at least the annular sealing gap does not widen toward the axially central portion of the annular surface, so that the capillary force acts toward the central portion of the annular sealing gap. This structure thus effectively prevents the oil filled in the sealing gap from flowing out.

FIGS. 8A to 8D illustrate different variations in which the inner circumferential surface 53 of the seal plate 50 facing the second labyrinth gap 62 is provided in such a manner that at least the second labyrinth gap 62 does not widen toward the central portion of the inner circumferential surface 53 in the axial direction. However, the present invention is not limited to these variations.

Figure 8A:
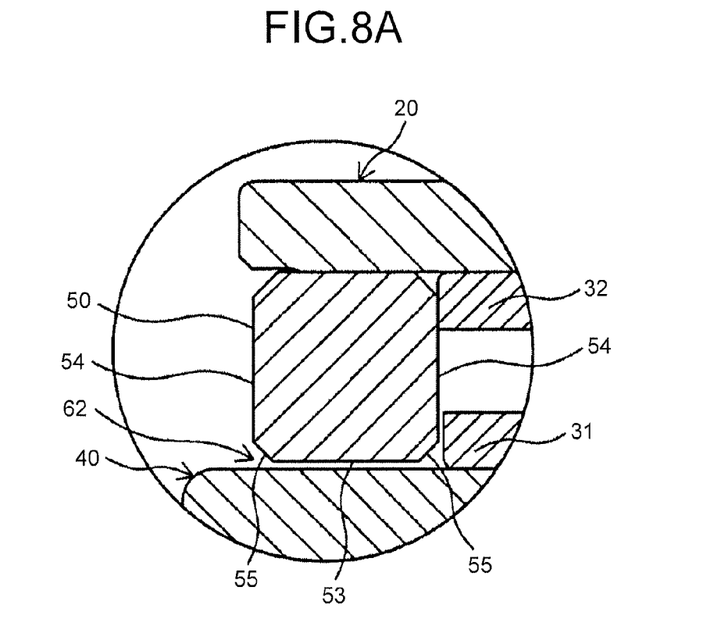
FIG. 8A is a sectional view illustrating an exemplary shape of the inner circumferential surface (an annular surface) of a seal plate (a first sealing member)
Figure 8B:
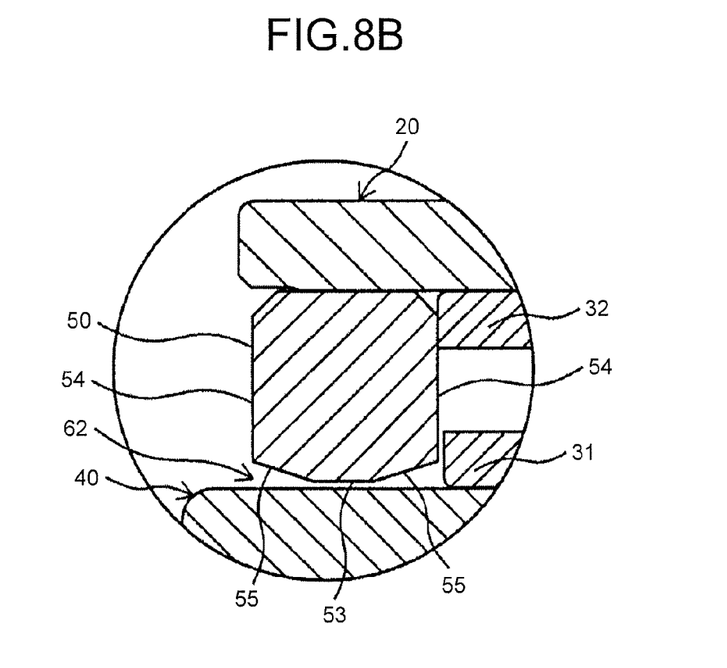
FIG. 8B is a sectional view illustrating an exemplary shape of the inner circumferential surface (the annular surface) of the seal plate (the first sealing member)
Figure 8C:
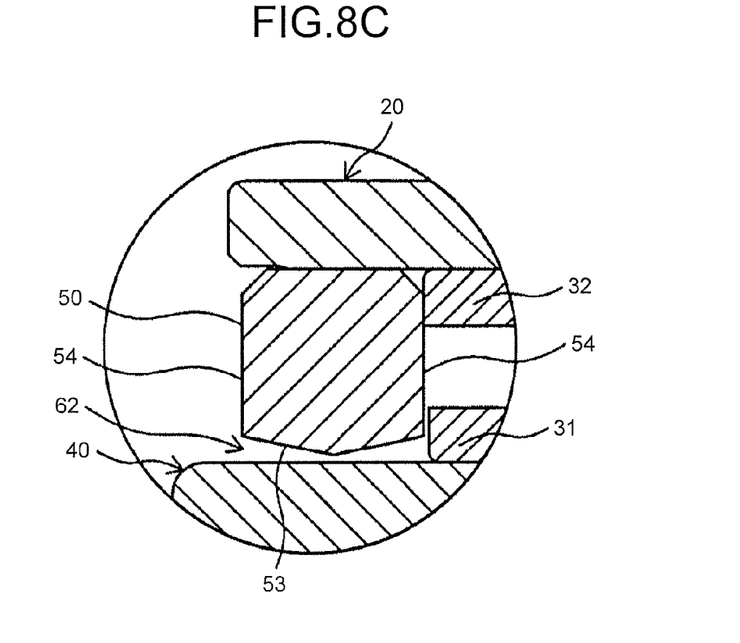
FIG. 8C is a sectional view illustrating an exemplary shape of the inner circumferential surface (the annular surface) of the seal plate (the first sealing member)
Figure 8D:
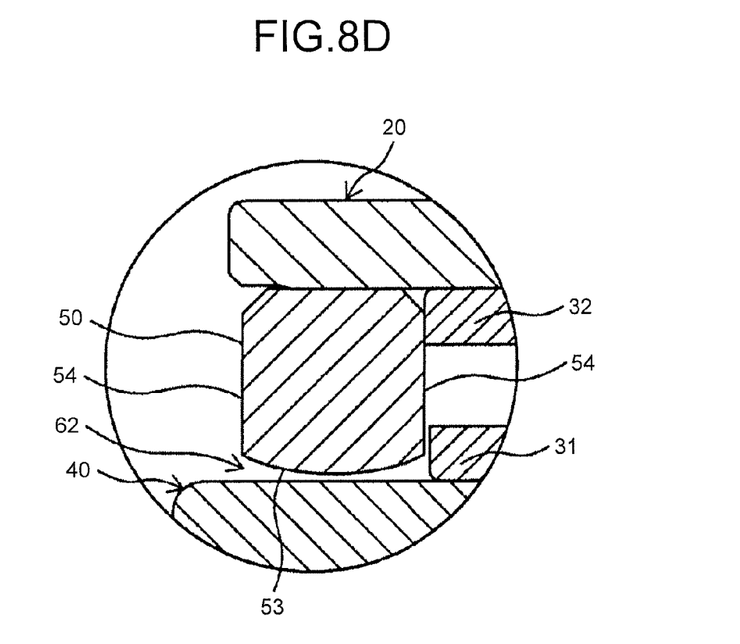
FIG. 8D is a sectional view illustrating an exemplary shape of the inner circumferential surface (the annular surface) of the seal plate (the first sealing member).

FIG. 8A illustrates a variation in which each of the tapered surfaces 55 is provided on both sides of the cylindrical inner circumferential surface 53, that is, on the corner portions between the cylindrical inner circumferential surface 53 and the end face 54 on both sides. FIG. 8B illustrates a variation in which the tapered surface 55 has a larger area in comparison with FIG. 8A and the cylindrical surface is positioned in the central portion in the axial direction. FIG. 8C illustrates a variation in which the inner circumferential surface 53 is a convex surface provided without the cylindrical surface in the central portion. The inner circumferential surface 53 is constituted by two tapered surfaces that meet at the central portion. Thus, the central portion of the inner circumferential surface 53 projects toward the direction perpendicular to the axial direction looking like a triangle vertice in a sectional view. FIG. 8D illustrates a variation in which the inner circumferential surface 53 is defined by a convex circular arc projecting toward the second labyrinth gap 62 in a sectional view. In any of these variations, filling the second labyrinth gap 62 with oil forms the fluid seal 70 because the oil is retained in the central portion of the second labyrinth gap 62 by the capillary force.

As described above, the present invention can be applied to a pivot assembly bearing that swingably supports a magnetic head arm in a magnetic disk drive device, for example. More particularly, the present invention can be suitably applied to a hard disk drive device used for a server.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pivot assembly bearing for a disk drive comprising:
    a sleeve;
    a shaft inserted into the sleeve;
    a pair of rolling bearings disposed between the sleeve and the shaft such that the rolling bearings are separated apart from each other in an axial direction, the rolling bearings comprising:
        an inner ring fixed to the shaft;
        an outer ring fixed to the sleeve; and
        a rolling element provided between the inner ring and the outer ring; and
    at least in one of the rolling bearings, a first sealing member contacting an end face of the outer ring facing an outer side of the pivot assembly bearing in the axial direction, forming a first labyrinth gap between the first sealing member and an end face of the inner ring facing the outer side in the axial direction, and forming a second labyrinth gap between the first sealing member and the shaft.

2. The pivot assembly bearing according to claim 1, wherein the end face of the inner ring forming the first labyrinth gap is positioned at an inner side of the pivot assembly bearing in the axial direction in relation to the end face of the outer ring.

3. The pivot assembly bearing according to claim 1, wherein the first sealing member is provided on both ends in the axial direction.

4. The pivot assembly bearing according to claim 1, wherein a lubricating fluid is retained through an entire circumference of the second labyrinth gap.

5. The pivot assembly bearing according to claim 4, wherein in the first sealing member, an annular surface facing the second labyrinth gap is provided in such a manner that at least the second labyrinth gap does not widen toward a central portion of the annular surface in the axial direction.

6. The pivot assembly bearing according to claim 5, wherein the annular surface is a convex surface that the central portion of the annular surface in the axial direction projects toward the second labyrinth gap in a sectional view.

7. The pivot assembly bearing according to claim 5, wherein a corner portion between an end face of the first sealing member and the annular surface is tapered.

8. The pivot assembly bearing according to claim 1, further comprising a second sealing member that covers the second labyrinth gap and that is disposed on the outer side of the first sealing member in the axial direction.

9. A hard disk drive device comprising:
a magnetic disk;
a magnetic head;
a magnetic head arm that moves the magnetic head above the magnetic disk; and
a pivot assembly bearing that swingably supports the magnetic head arm, the pivot assembly bearing comprising:
a sleeve;
a shaft inserted into the sleeve;
a pair of rolling bearings disposed between the sleeve and the shaft such that the rolling bearings are separated apart from each other in an axial direction, the rolling bearings comprising:
an inner ring fixed to the shaft;
an outer ring fixed to the sleeve; and
a rolling element provided between the inner ring and the outer ring; and
at least in one of the bearings, a first sealing member contacting an end face of the outer ring facing an outer side of the pivot assembly bearing in the axial direction, forming a first labyrinth gap between the first sealing member and an end face of the inner ring facing the outer side in the axial direction, and forming a second labyrinth gap between the first sealing member and the shaft.

10. A pivot assembly bearing for a disk drive, comprising:
a sleeve;
a shaft;
a rolling bearing disposed between the sleeve and the shaft;
a first sealing member disposed on an outer side of the rolling bearing in an axial direction;
a first labyrinth gap between the first sealing member and an end face of an inner ring facing the outer side in the axial direction; and
a lubricating fluid retained through an entire circumference of an annular second labyrinth gap provided between the first sealing member and the sleeve or between the first sealing member and the shaft.

11. The pivot assembly bearing according to claim 10, wherein in the first sealing member, an annular surface facing the annular second labyrinth gap is formed in such a manner that at least the annular second labyrinth gap does not widen toward a central portion of the annular surface in the axial direction.

12. The pivot assembly bearing according to claim 11, wherein the annular surface a convex surface that the central portion of the annular surface in the axial direction projects toward the second labyrinth gap in a sectional view.

13. The pivot assembly bearing according to claim 11, wherein a corner portion between an end face of the first sealing member and the annular surface is tapered.

14. The pivot assembly bearing according to claim 10, further comprising a second sealing member that covers the sealing gap and that is disposed on the outer side of the first sealing member in the axial direction.

15. The pivot assembly bearing according to claim 10, wherein the rolling bearing comprises:
an inner ring fixed to the shaft;
an outer ring fixed to the sleeve; and
a rolling element provided between the inner ring and the outer ring, wherein
an inner side of the first sealing member in the axial direction contacts an end face of the outer ring facing the outer side in the axial direction, and
the first labyrinth gap is formed between the end face of the first sealing member facing the inner side in the axial direction and an end face of the inner ring facing the outer side in the axial direction.

16. The pivot assembly bearing according to claim 15, wherein the end face of the inner ring forming the first labyrinth gap is positioned at the inner side in the axial direction in relation to the end face of the outer ring.

17. The pivot assembly bearing according to claim 10, wherein the rolling bearing and the first sealing member are provided on both ends in the axial direction.

18. A disk drive device comprising:
a magnetic disk;
a magnetic head;
a magnetic head arm that moves the magnetic head above the magnetic disk; and
a pivot assembly bearing that swingably supports the magnetic head arm, the pivot assembly bearing comprising:
a sleeve;
a shaft;
a rolling bearing disposed between the sleeve and the shaft;
a first sealing member disposed on an outer side of the pivot assembly bearing on the rolling bearing in an axial direction;
a first labyrinth gap between the first sealing member and an end face of an inner ring facing the outer side in the axial direction; and
a lubricating fluid retained through an entire circumference of an annular second labyrinth gap provided between the first sealing member and the sleeve or between the first sealing member and the shaft.

* * * * *